United States Patent
Goyal et al.

[11] Patent Number: 5,940,871
[45] Date of Patent: Aug. 17, 1999

[54] COMPUTER SYSTEM AND METHOD FOR SELECTIVELY DECOMPRESSING OPERATING SYSTEM ROM IMAGE CODE USING A PAGE FAULT

[75] Inventors: Prabhakar Goyal, Sunnyvale, Calif.; Grama Kasturi Harish, Cedar Park; James Darrell Heath, Austin, both of Tex.; Chakravarthy Jagannadhan, Santa Clara, Calif.; Vishwanath Venkataramappa, Austin, Tex.

[73] Assignee: International Business Machines Corporation, Armonk, N.Y.

[21] Appl. No.: 08/739,228

[22] Filed: Oct. 28, 1996

[51] Int. Cl.⁶ .............. G06F 12/10; G06F 13/00; G06F 5/00
[52] U.S. Cl. .............. 711/206; 711/102; 395/888; 395/652
[58] Field of Search .............. 711/206, 208, 711/209, 102, 103, 104, 207, 170, 202, 203; 395/888, 651, 652

[56] References Cited

U.S. PATENT DOCUMENTS

| | | | |
|---|---|---|---|
| 5,481,701 | 1/1996 | Chambers, IV | 707/101 |
| 5,490,260 | 2/1996 | Miller et al. | 711/100 |
| 5,530,847 | 6/1996 | Schieve | 395/183.14 |
| 5,632,024 | 5/1997 | Yajima et al. | 395/381 |
| 5,696,927 | 12/1997 | MacDonald et al. | 395/888 |
| 5,699,539 | 12/1997 | Garber et al. | 711/206 |

*Primary Examiner*—Glenn Gossage
*Attorney, Agent, or Firm*—Robert M. Carwell; Mark S. Walker

[57] ABSTRACT

A system and method for compressing portions of the operating system in a ROM image and for executing the system from the compressed image. Compression is used to reduce the size of the ROM image to reduce component cost. Low use segments are compressed. The operating system is initialized into a virtual address space with entries only for the uncompressed segments. Attempts to execute a compressed segment result in a page fault. The page fault handler determines that the segment is compressed, allocates a new page and decompresses the page into RAM for execution. The RAM copy of the segment is used for execution until the page is reused for another purpose. Later execution causes a new page fault and reallocation.

A memory object reference is created for components of the image; a virtual memory page reference is then made for each component not in a compressed form; instructions are then executed by reference to the image; a page fault is detected when attempting to execute an instruction in a component not having a page table reference; a compressed image is then decompressed into the random access memory in response to the page fault.

3 Claims, 7 Drawing Sheets

| Address | Segment |
|---|---|
| 0x100000 | Kernel Data & BSS |
| | Boot Strap Data & BSS |
| | RNS Data & BSS |
| | ⋮ |
| | Loader Info |
| | Boot Info |
| | ⋮ |
| 0xc00000 | Uncompressed Kernel Text & Read Only Data |
| | Compressed Kernel Text & Read Only Data |
| | Boot Strap Text & Read Only Data |
| | Compressed Boot Strap Text & Read Only Data |
| | RNS Text & Read Only Data |
| | Compressed RNS Text & Read Only Data |

Data Segments — 1002

Text and Read-Only Data Segments — 1004

FIG. 10

COMPUTER SYSTEM AND METHOD FOR SELECTIVELY DECOMPRESSING OPERATING SYSTEM ROM IMAGE CODE USING A PAGE FAULT

BACKGROUND OF THE INVENTION

1. Field of the Invention

The present invention relates to computer system operations and, and, in particular, to the operation of a computer system executing instructions embedded in a read-only memory (ROM) device. More particularly, the present invention relates to the operation of an embedded computer system having a solid state read-only memory (ROM) containing both compressed and uncompressed operating instructions for the embedded system.

2. Background and Related Art

The present invention is directed to an improved method and apparatus for use with embedded computer systems. Embedded computer systems include a processor for performing instructions and input and output interfaces to collect data and transmit control signals. The instructions to be performed are typically stored on a read-only memory (ROM) device. Embedded computer systems are used, for example, to control automobile engine function and to provide a variety of other "intelligent devices."

Manufacturers using embedded computer systems are very conscious of the cost of each component of those systems. Small cost savings in embedded systems used in mass produced items such as automobiles are very important when considered over the production volume of the item. The size of ROM and size of random access memory (RAM) provided for an embedded system directly affect cost. ROM is less expensive than RAM and has the advantage of retaining data even when powered off (ROM provides non-volatile storage.).

ROM images are therefore used to contain the basic operating programs for an embedded device. A minimum amount of RAM is provided to store data readings and other changeable information. However, as increased function is added to an embedded system, the amount of data and instructions that must be stored in the ROM also increases. Manufactures are then faced with the prospect of having to add additional ROM or to decrease function. Additional ROM may be undesirable since it could significantly add cost due to a requirement to add an additional ROM device and the associated circuitry.

Thus, a technical problem exists of finding a way to put additional data and instructions in a ROM image without increasing the overall cost of an embedded device.

SUMMARY OF THE INVENTION

The present invention is directed to an apparatus and method for storing additional function in a ROM device through partial compression of the ROM image. Compressed ROM image areas are decompressed into the device RAM when the area is accessed. The system page fault mechanism is used to perform the decompression and manage access to the compressed and uncompressed images.

The preferred embodiment of the present system is directed to a method for executing computer instructions in a computer system having a processor, random access memory and read-only memory, wherein the read-only memory contains an image of the computer instructions to be executed, at least a portion of the image being in a compressed form. The method comprises the steps of: creating a In one embodiment a memory object reference is created for components of the image; a virtual memory page reference is then made for each component not in a compressed form; instructions are then executed by reference to the image; a page fault is detected when attempting to execute an instruction in a component not having a page table reference; a compressed image is then decompressed into the random access memory in response to the page fault.

It is therefore an object of the present invention to provide an apparatus and method for compressing portions of a ROM image and for uncompressing those portions only when accessed.

It is yet another object of the invention to provide an apparatus and method for executing a ROM image containing compressed image portions without decompressing all sections of the ROM image into system RAM.

It is yet another object of the invention to provide an apparatus and method for executing a partially compressed ROM image without requiring changes to the operating system to detect compressed from uncompressed portions.

The foregoing and other objects, features and advantages of the invention will be apparent from the following more particular description of a preferred embodiment of the invention, as illustrated in the accompanying drawings wherein like reference numbers represent like parts of the invention.

BRIEF DESCRIPTION OF THE DRAWINGS

FIG. 10 is a diagram illustrating the segments of a ROM image according to the present invention.

DETAILED DESCRIPTION

The present invention operates in conjunction with a computer system having a processor and memory. The preferred embodiment is directed to an embedded microprocessor based computer system, such as one used to control "intelligent devices" or provide functions such as an intelligent "set-top box" for decoding cable signals or Internet traffic.

Figure 1:
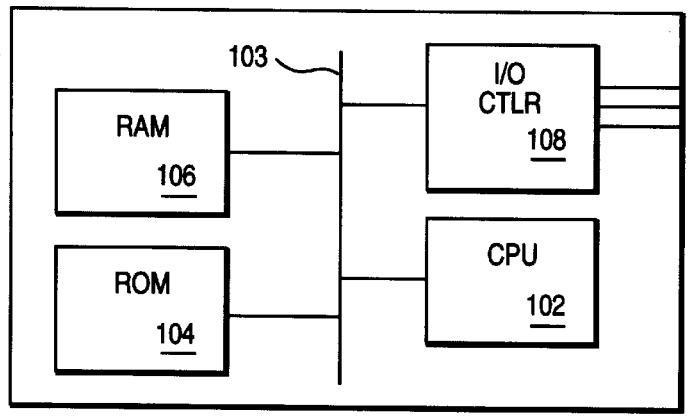
FIG. 1 is a block diagram of an embedded a computer system embodying the preferred embodiment of the present invention.

An embedded computer system, in a simple form, is illustrated in FIG. 1. The overall system 100 includes a central processing unit (CPU) or processor 102, for performing the necessary data collection, calculation and control activities. Processor 102 can be any one of several known microprocessors that support virtual memory and memory pages. The preferred embodiment uses an International Business Machines (IBM) PowerPC microprocessor (PowerPC is a trademark of the International Business Machines Corp., Armonk, N.Y.) The processor is connected by system bus 103 to a read-only memory device (ROM) 104, a random access memory (RAM) 106 and to input/output (I/O) controller 108. Input/Output controller 108 manages the interface of the embedded device to the outside world. The input/output (I/O) controller may be connected to devices providing input to the controller, for example, digital or analog signals from instruments, it may be connected to control signal outputs (digital or analog) and it may provide an output display, such as a light emitting diode (LED) LED display, screen display or similar device. Hardcopy output devices and diagnostic, debugging or programming devices may also be attached to the embedded system.

The ROM memory may be of any known type. The preferred embodiment employs a ROM memory manufactured by the Advanced Microdevices (AMD) Corporation, Austin, Tex. or Intel Corp. capable of holding 512K×8 (4 Megabytes) or 128K×8 (1 Megabytes) of information. The preferred embodiment includes RAM with a capacity of 4 Megabytes.

The ROM image must include all of the instructions and data necessary to operate the embedded device. The image includes an operating system portion that controls the overall operation of the system and an application portion that directs the specific application of the embedded system. For example, an embedded automobile engine control system will have an engine control application embedded in the ROM image.

The operating system in the ROM may be very simple, such as a reduced function digital operating system (DOS) operating system based on IBM Personal Computer Dos (PC-DOS) operating system. Increasingly, however, embedded systems require additional operating system function such as that provided by the IBM Microkernel Embedded Operating System. The IBM Microkernel operating system provides a more robust operating system with greater function than a DOS based operating system.

A full function operating system contains a number of functions that are only rarely executed. For example, error processing routines are invoked only upon the occurrence of a particular error. Other operating system or functional routines may be invoked very rarely. It is desirable to minimize the ROM image space devoted to routines with low execution probability.

Compression of the ROM image has been proposed as a means for reducing the ROM size for a given ROM image. Prior art systems have the disadvantage, however, of requiring sufficient RAM to expand the entire ROM image for execution. Uncompressed ROM image components can be executed directly from the ROM without loading them into the RAM. A system that requires decompression of all routines significantly increases RAM demands while managing ROM size. This tradeoff requiring additional RAM is not economical in most cases.

The present invention proposes compression of only the least frequently used portions of the operating system or application program. The present invention will be discussed with reference to compression of operating system instructions, but these techniques could be applied to application program compression as well.

Figure 2:
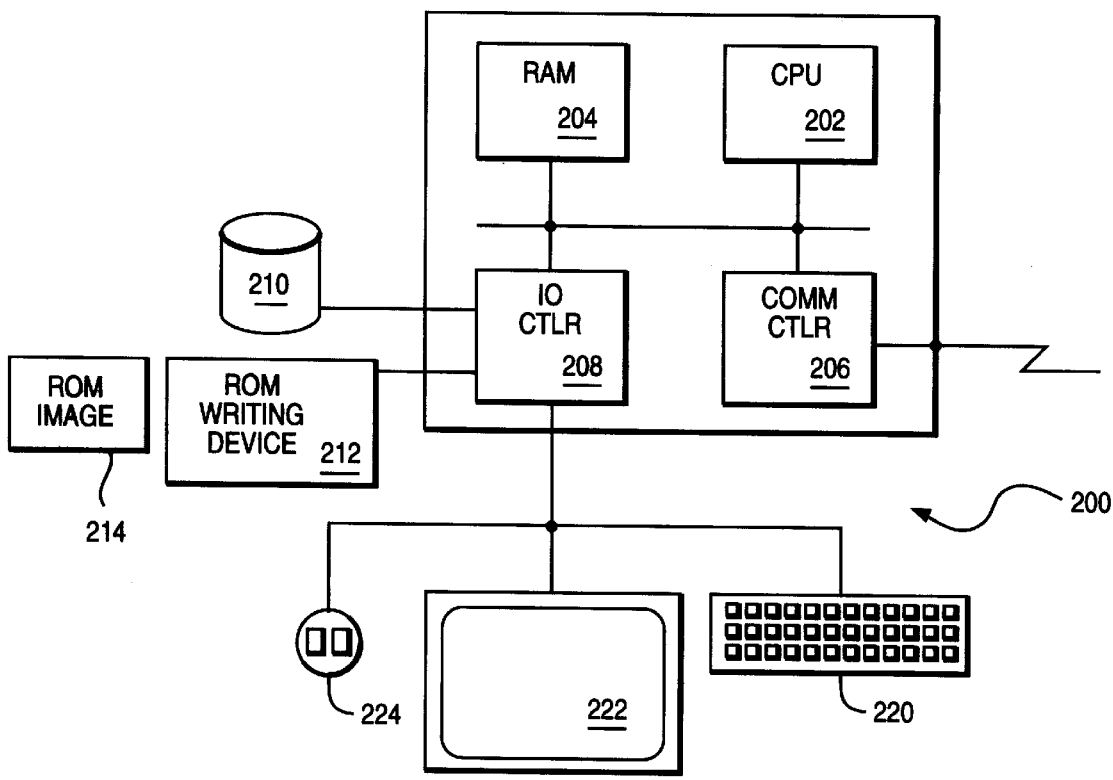
FIG. 2 is a block diagram of a computer system for creating a compressed and uncompressed ROM image according to the present invention.

FIG. 2 illustrates a system for building ROM images according to the present invention. Each ROM image is constructed by combining the operating system functions and application functions into a single image that is loaded into a ROM device. ROM devices can be any one of a variety of solid state, optical or magnetic devices including those that are writable only once or many times. Devices such as compact disk read-only memory (CD-ROMs), erasable programmable read-only memories (EPROMS), and related devices are included within the scope of this invention.

The ROM image creation system 200 includes an embedded CPU 202, random access memory 204, input/output controller 208, and, optionally, a communication controller 206. The system may, of course have additional components without departing from the spirit of the invention. The input/output controller 208 controls keyboard 220, display 222 and pointing device 224. In addition, it controls reading and writing to a permanent or removable storage device 210 which can be a magnetic, optical or other similar device. Controller 208 also controls creation of the ROM 214 itself through a ROM writing device 212. In the description of the present invention all of these components will be considered as part of a single system, however, in many cases the ROM image will be created on one system and transferred to another system specifically designed to produce or reproduce ROM devices. A single image may also be provided to multiple machines, each producing different types of ROM devices. Each of these configurations is considered to be within the scope of the present invention.

The microkernel operating system for the embedded device needs to include instructions and data for the operating system kernel (basic operating system function), bootstrap (initial code load functions), root name server—(RNS), micro teletypewriter (input/output support), selected embedded device drivers to support data collection and control, and other service tasks such as file system management and communication. The precise configuration depends on the particular embedded application. Each of these programs includes a text area, data area, block started by symbol (BSS) uninitialized data section of an executable program and read-only sections. The text area contains program instructions that can be shared by each invocation of the function. A data area must exist for each invocation and it contains the specific data values for that invocation. The text and read-only data areas provide the best opportunity for compression because they tend to be large and can be decompressed only once and shared after that decompression. Although the preferred embodiment compresses only these areas, the invention is equally applicable to compression of other image areas.

Figure 3:
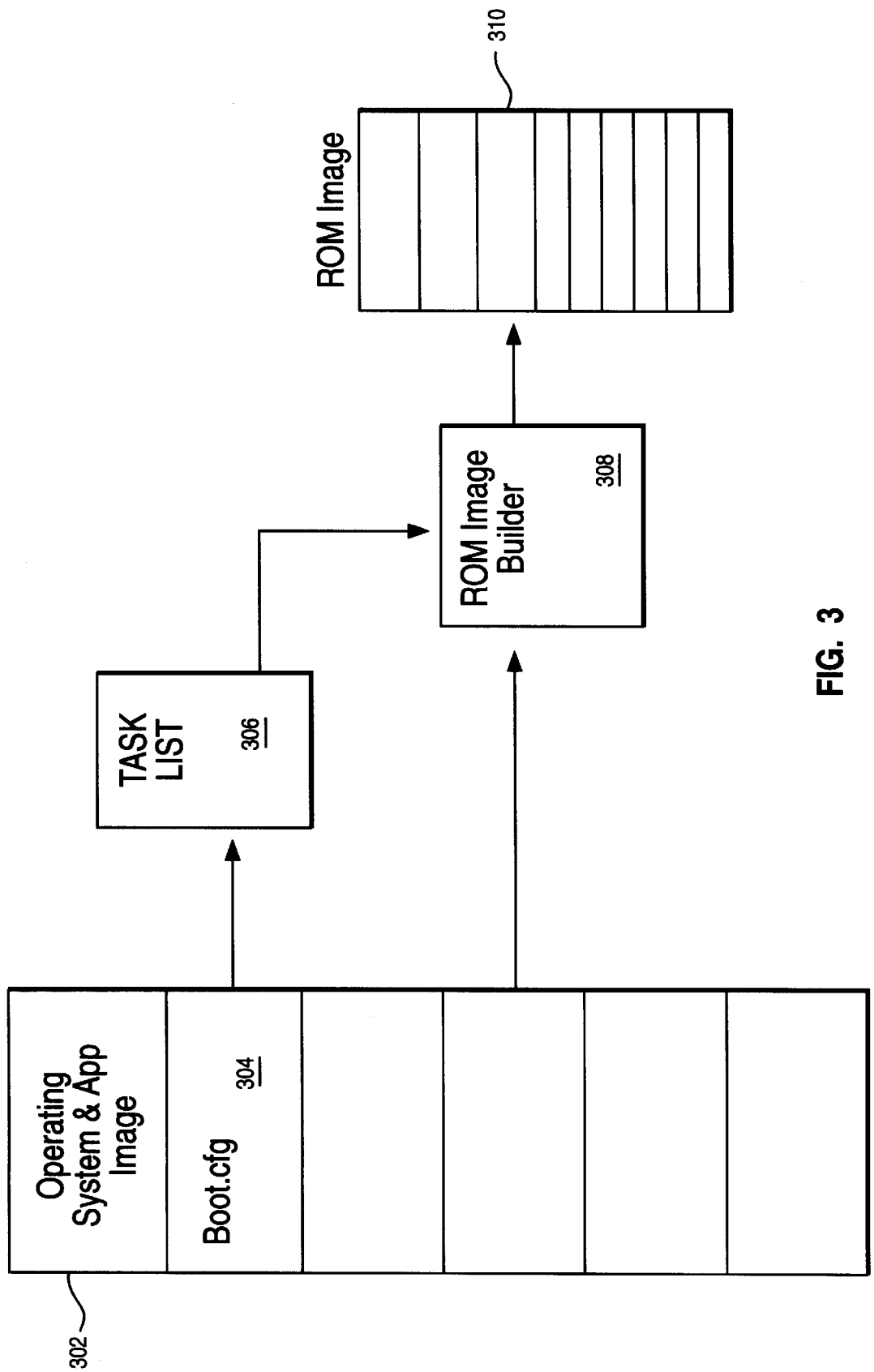
FIG. 3 is a block diagram illustrating the process of creating a ROM image according to the present invention.

With reference to FIG. 3, the present invention creates a ROM image from an operating system and application image 302 maintained on a development system. The image 302 contains the full operating system in uncompressed form. The system developer specifies the components that must be included in a particular ROM image in a file 304 entitled boot.cfg. Other specification methods could be used without departing from the invention, for example, the developer could select from displayed routines, or the system could scan an execution trace for needed routines. The boot.cfg file also contains a marking indicating which routines should be compressed.

The boot.cfg file is scanned by the image building system which develops a task list 306 containing a list of tasks that must go into the ROM image and their storage path information. This list also contains a function delimiter that specifies where task compression is to begin. The system them builds or creates 308 ROM image 310 by reading through the task list 306. The builder, 308 in the preferred embodiment, places the text and read-only data at a high offset into the ROM image and the data and bss at low offset. Separate uncompressed and compressed sections are created in the ROM image.

Figure 4:
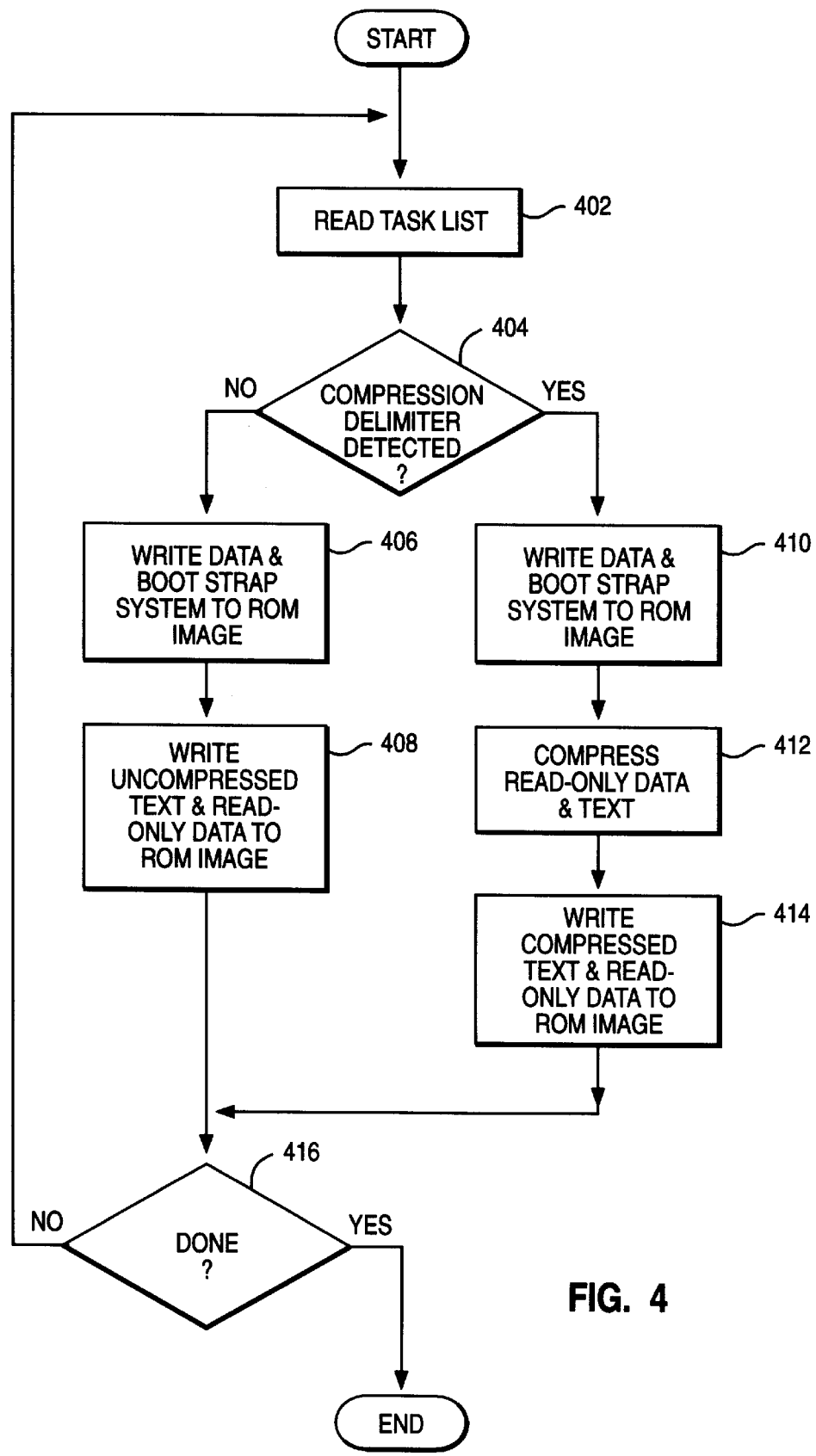
FIG. 4 is a flowchart of the process of creating a ROM image according to the present invention.

The process of builder 308 is illustrated in the flowchart of FIG. 4. The builder reads the task list at step 402 to determine the task code to include in the image. The builder tests to determine whether the compression delimiter has been detected at step 404. If not, the data and bss sections are written to the ROM image 406, and the uncompressed text and read-only data are written at step 408 to the ROM image. Once the compression delimiter has been detected at step 404, the builder writes the data and bss to the ROM image at step 410, then compresses the text and read-only data at step 412, before writing the compressed data to the ROM image at step 414. The compression algorithm of the preferred embodiment is optimized for optimal decompression performance, i.e. the compression operation is slow but decompression is very fast. Other compression routines may be used, however, without departing from the spirit of the invention.

Figure 11:
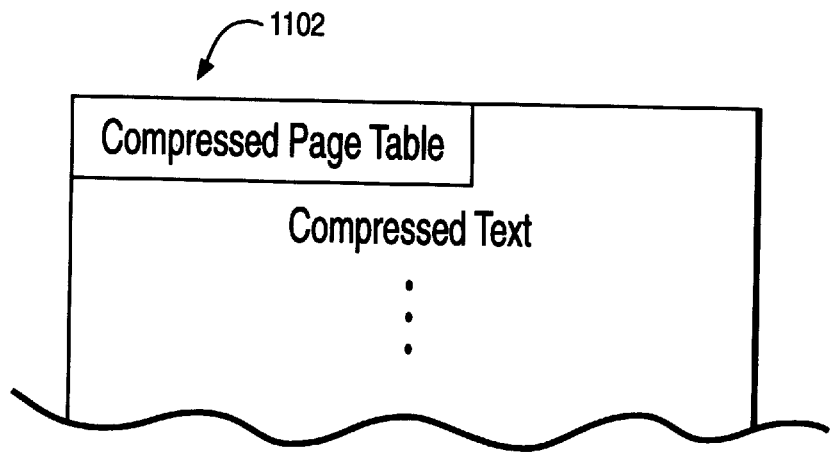
FIG. 11 is a diagram illustrating the segments of a compressed portion of a ROM image according to the present invention.

The ROM image is complete once the builder has processed all of the tasks listed. The ROM image can be transferred to a ROM device and installed in the embedded system. The ROM image of the present invention is illustrated in FIG. 10. The image contains a group of data segments 1002 and a group of compressed and uncompressed text and read-only data segments 1004. As shown in FIG. 11 compressed section includes a compressed page table 1102, each showing the offset of each compressed page in the compressed section. This table is used when a page fault occurs so that the needed page can be quickly located and decompressed.

The ROM image is used to operate the embedded system as follows.

Figures 5, 6, 7:
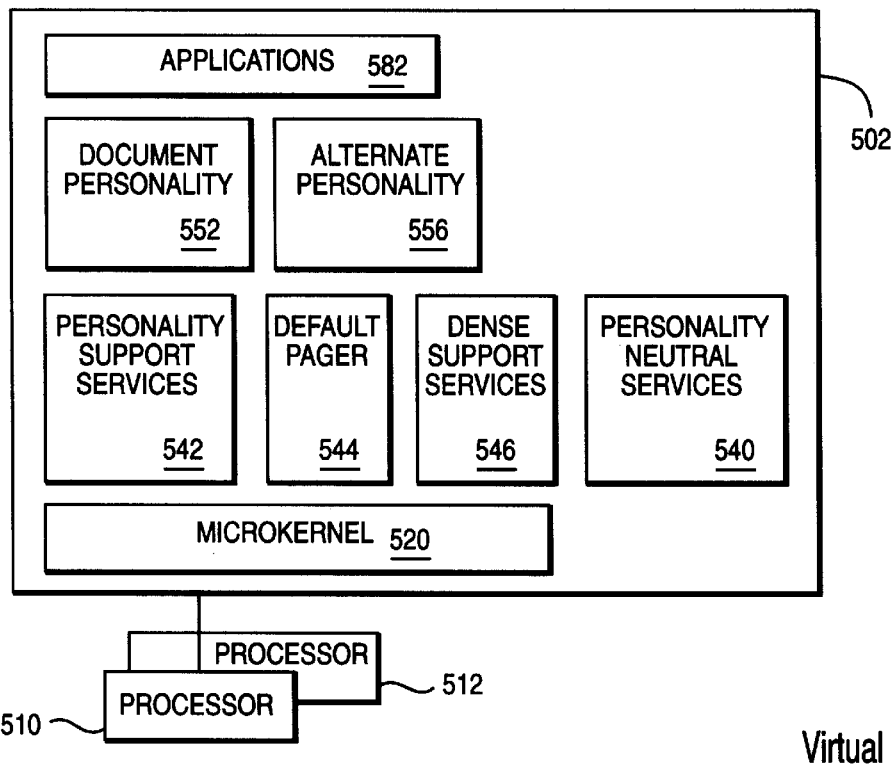
FIG. 5 is a block diagram of a microkernel operating system according to the present invention.
FIG. 6 is a table illustrating a virtual memory VM map according to the present invention.
FIG. 7 is an illustration of a page table according to the present invention.

The structure of a microkernel system according to the present invention is illustrated in FIG. 5. The microkernel operating system is loaded into memory 502. The major components of the operating system include the microkernel 520 that provides the basic operating system services and interfaces to the hardware processor or processors 510 and 512; the personality support services 542; the default pager 544; the device support services 546; the personality neutral services 540; the dominant and alternate personalities 552, 556; and the applications 582. The term "personality" as used herein refers to other unique components of a given one of differing operating systems which operate in conjunction with a single, generic microkernel portion of such an operating system.

When the system is started, an the system firmware passes control to the operating system bootloader (not shown.) The bootloader passes information about the loadable operating system segments. The information is stored in data structures containing the address, size, and a flag indicating whether the segment is compressed or not. The bootloader then passes control to the microkernel 520 for initialization.

The microkernel 520 initialization processing creates a virtual memory map (VMAP) entry for each of the compressed and uncompressed segments in the system image based on the loader data structures. The VMAP entry (see FIG. 6) contains the beginning virtual address and size of the entry and the microkernel VM Object backing the segment. The VM Object contains the physical address corresponding to the virtual address of the corresponding segment. Compressed segments are all assigned to a single compression object (cmp_object) as their backing VM object. Page table entries (FIG. 7) are created for each of the uncompressed segments but not for the compressed segments. The page table entry translates a page reference to the physical address of the page in memory or in the ROM image.

Figure 12:
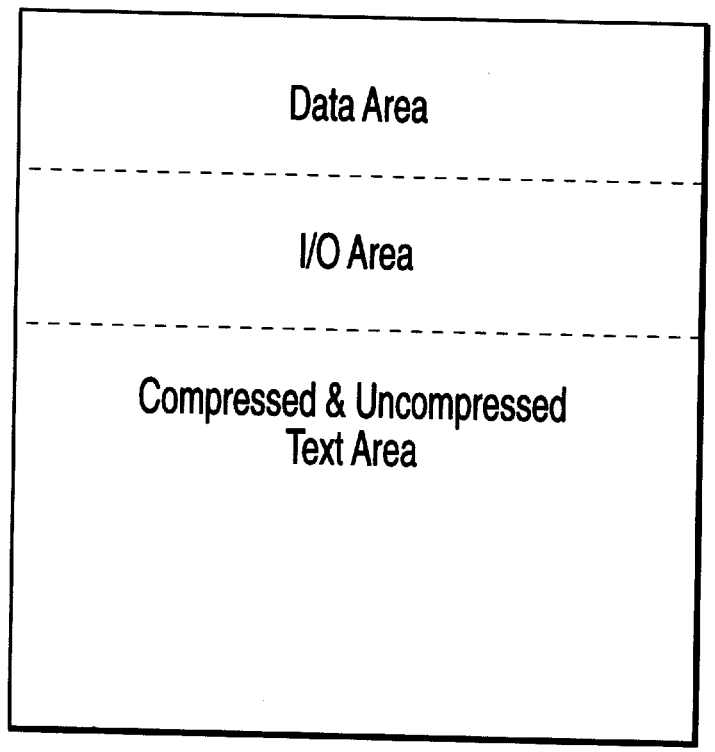
FIG. 12 is a diagram of kernel memory according to the present invention.

The layout of the virtual memory of the kernel is shown in FIG. 12. Virtual memory management systems separate the logical system memory reference from the physical address of the referenced object. This allows the system to reference a greater amount of memory than is physically present in a system. Virtual memory management schemes typically are based on pages of memory. At any point in time, a number of pages are present in memory. These pages are tracked using a page table that cross references the virtual address to the location of the actual page containing the memory data. If an address reference is requested that does not exist in the page table, a page fault occurs requiring the referenced paged to be loaded into memory. Memory pages are typically managed on a least recently used basis. The system will discard the least recently used (LRU) page in memory and replace it with the one requested. If necessary, the page to be discarded is written out to storage before the page is freed.

A Bootstrap task is created by the microkernel upon completion of initialization. The bootstrap task creates all other personality neutral tasks. The VMAP entries are remapped into the address space of each of the created tasks.

Figure 8:
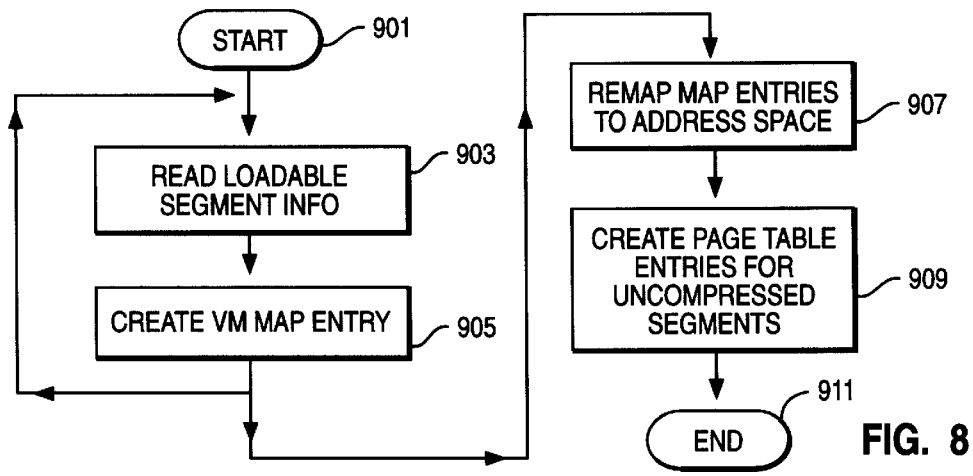
FIG. 8 is a flowchart of the process of initializing an operating system from compressed and uncompressed ROM according to the present invention.

Referring now to FIG. 8, depicted therein is a flow chart of the process of initializing an operating system from compressed and uncompressed ROM, according to the invention. The process begins at block 901 whereupon loadable segment information is read, step 903, followed by creating of a VM map entry, step 905. These steps 903, 905 are repeated until all loadable segment information has been read and corresponding VM map entries created, whereupon the process flows to step 907 wherein these VM map entries are remapped to address space. Page table entries are then created for the uncompressed segments, step 909, whereupon the process is completed at step 911.

Figure 9:
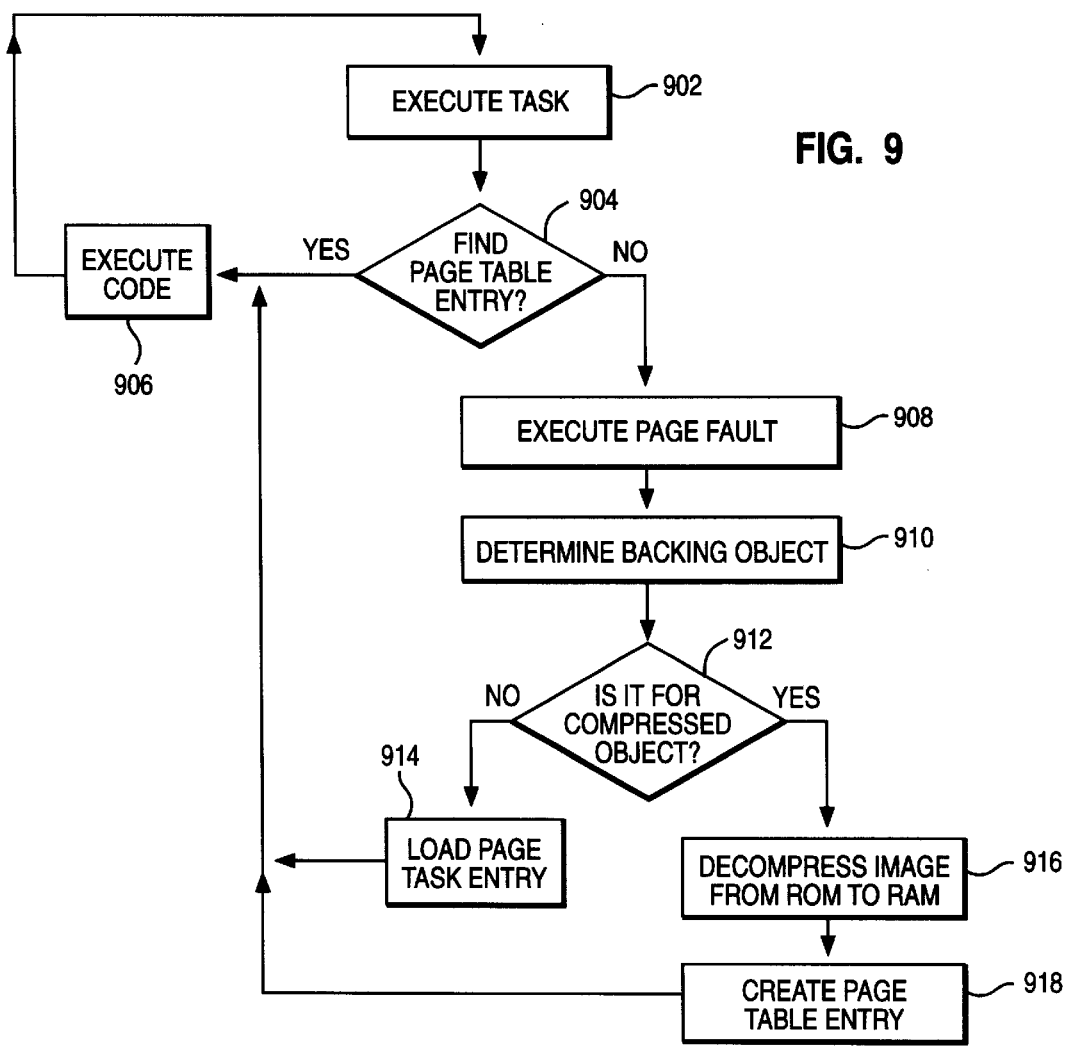
FIG. 9 is a flowchart of the process according to the present invention.

As shown in FIG. 9, tasks are executed at step 902 on the system which reference uncompressed segment text and read-only data code executing at step 906 through the page table entry found at step 904. A reference to compressed segment text or read-only data results in a page fault at step 904 since there is no page table entry for that segment. The page fault is executed at step 908 and handled by the microkernel pager that attempts to load the referenced page by using the VM Object and determining the backing object, at step 910. A determination will be made of whether the backing object is for a compressed object at step 912. A compressed segment will reference the compression object (cmp_object) causing the compression fault handler to be called, signified by an exit on the "Yes" path from step 912. The compression fault handler allocates a free page from the Free Page Queue maintained by the kernel and decompresses the compressed code at step 916 from ROM to RAM and from its original location to the new physical page frame. A temporary virtual address is assigned to map the new page during the copy operation. The handler then creates a page table entry at step 918 for the virtual address that faulted assigning it the new page into which the compressed code has been decompressed and the flow then continues to step 906. If the check at step 912 indicates the backing object is not for a compressed object, flow exits along the "No" path to step 914 wherein a page task entry is loaded. Flow then loops back to step 906.

The system will continue to access the RAM copy of the decompressed segment as long as the kernel does not run out of free pages. If the kernel needs to reuse pages, old pages are reused through a least recently used deallocation process. If the compressed segment is referenced after the RAM page has been reallocated, a page fault will occur again and the process of page allocation and decompression will be repeated.

The present invention has been described with reference to a microkernel operating system. It will be recognized, however, that the methods and apparatus of the present invention apply to any type of operating system or operating environment that supports virtual memory management or any similar scheme that separates physical memory reference from the "logical" system reference.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A method for executing computer instructions in a computer system having a processor, random access memory and read-only memory, wherein the read-only memory contains a plurality of component images of the computer instructions to be executed, at least one of said component images being in a compressed form to form a compressed component image, the method comprising the steps of:

creating a virtual memory page table reference in said read-only memory with said processor for each of said component images that are not in a compressed form;

detecting with said processor a page fault when the processor attempts to execute a requested instruction in a component image not having a page table reference;

decompressing with said processor a compressed image containing the requested instruction from said read-only memory into said random access memory in response to said page fault.

2. The method of claim 1, wherein the decompressing step decompresses only the page of the compressed component image containing the requested instruction.

3. A computer system having a processor, random access memory and read-only memory, the read-only memory containing component images of executable instructions, with at least one of the components being compressed to form a compressed component image, the system comprising:

means for creating a virtual memory page table reference for each component that are not in compressed form;

means for detecting a page fault when the processor attempts to execute a requested instruction in a component not having a page table reference;

means for decompressing a compressed image containing the requested instruction into said random access memory in response to the page fault.

* * * * *